United States Patent [19]

Fukino

[11] 4,238,152
[45] Dec. 9, 1980

[54] FIXING DEVICE FOR A SWING AND SHIFTING MECHANISM
[75] Inventor: Kunihiro Fukino, Kawasaki, Japan
[73] Assignee: Nippon Kogaku K.K., Tokyo, Japan
[21] Appl. No.: 972,262
[22] Filed: Dec. 22, 1978
[30] Foreign Application Priority Data Dec. 27, 1977 [JP] Japan .......................... 52/175151[U]

[51] Int. Cl.³ ........................... G03B 5/06; G03B 5/02
[52] U.S. Cl. ..................................... 354/189; 354/190; 248/288.5; 248/289.3; 248/298
[58] Field of Search ................................ 354/189–190, 354/286; 248/288 B, 291, 296, 298, 289 R, 289 A; 350/247, 252

[56] References Cited
U.S. PATENT DOCUMENTS 321,139  6/1885  Samuels ............................... 354/189
2,347,406  4/1944  Frazer-Nash ..................... 248/296 X

FOREIGN PATENT DOCUMENTS 20938 of 1902 United Kingdom ...................... 354/189
711386  6/1954 United Kingdom ...................... 354/189

Primary Examiner—George H. Miller, Jr.
Assistant Examiner—Thomas H. Tarcza
Attorney, Agent, or Firm—Shapiro and Shapiro

[57] ABSTRACT

Fixing means including an operating member is provided on one of a swing portion and a shift portion and by operating the operating member to actuate said fixing means, the fixing means is engaged with the shift portion or the swing portion which is not provided with the fixing means and to a mount body to thereby fix the swing portion and the shift portion to the mount body at the same time.

14 Claims, 4 Drawing Figures

FIXING DEVICE FOR A SWING AND SHIFTING MECHANISM

BACKGROUND OF THE INVENTION

1. Field of the Invention

This invention relates to a fixing device for a swing and shifting mechanism in a camera.

2. Description of the Prior Art

The swing and shifting mechanism in a camera causes the picture-taking lens portion to suitably shift and swing relative to the film surface to thereby obtain a desired swing and shifting effect.

However, in the swing and shifting mechanism of the prior art, the fixing of a shift portion and a swing portion has been accomplished by separate fixing knobs. Therefore, to fix the lens portion during photography, the fixing of the shift portion and the swing portion had to be accomplished by operating the separate fixing knobs and this has led to the disadvantages that the fixing operation is cumbersome and that the two fixing knobs are hardly distinguishable from each other.

SUMMARY OF THE INVENTION

To overcome these problems, the present invention has, for its object, to provide a fixing device for a swing and shifting mechanism in which the fixing of the shift portion and the swing portion is accomplished at the same time by a single operating member, thereby making the operation simple and eliminating the possibility of confusion between the two fixing knobs.

To achieve such an object, according to the present invention, fixing means including a fixing member is provided in one of a swing portion and a shift portion and by operating the operating member to actuate said fixing means, the fixing means engages to the shift portion or the swing portion which is not provided with the fixing means and to a mount body to thereby fix the swing portion and the shift portion to the mount body at a time.

The invention will become more fully apparent from the following detailed description of some embodiments thereof taken in conjunction with the accompanying drawings.

DESCRIPTION OF THE PREFERRED EMBODIMENTS

Figure 1:
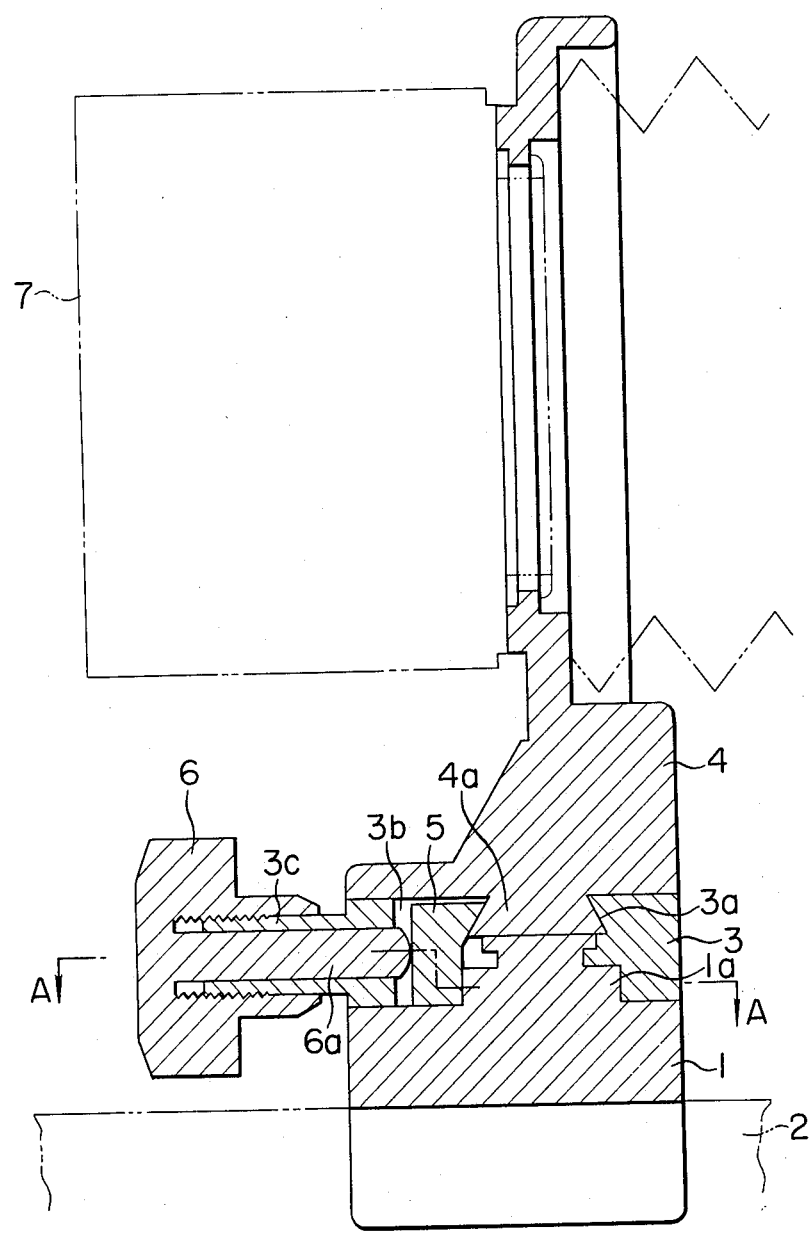
FIG. 1 is a cross-sectional front view of a first embodiment of the present invention.
Figure 2:
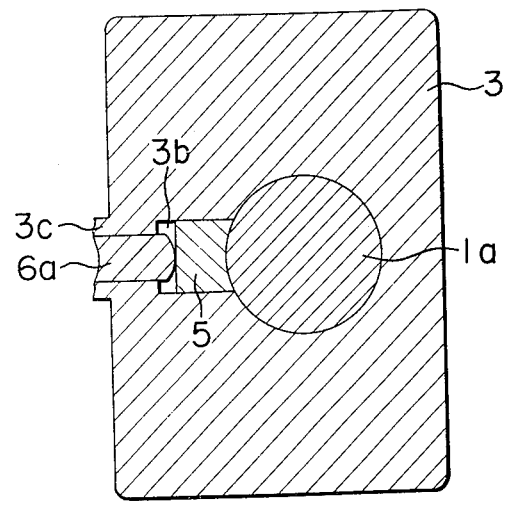
FIG. 2 is a cross-sectional view taken along line A—A in FIG. 1.

FIG. 1 shows a first embodiment of the present invention and FIG. 2 is a cross-sectional view taken along line A—A of FIG. 1. In FIG. 1, reference numeral 1 designates the mount body slidable to left and right, in FIG. 1, on a rail 2 which provides for focusing. This mount body need not always slide on the rail 2, but preferably it should be slidable as in the shown embodiment. A swing portion rotary shaft 1a is provided in the upper portion of the mount body 1 and a swing portion 3 is rotatable or swingable about the rotary shaft 1a for a predetermined angle on the mount body 1. A dovetail groove 3a is formed in the upper portion of the swing portion 3 and this, in combination with a dovetail 4a provided in the lower portion of a shift portion 4, enables the shift portion 4 to shift. Further, the swing portion 3 is provided with a cutout 3b and a shaft 3c. A fixing knob 6 is rotatably supported by the shaft 3c of the swing portion 3. Therefore, the fixing knob 6 is rotated about the rotary shaft 1a when the swing portion 3 is rotated about the same. A fixing piece 5 is provided in the cutout 3b so as to be movable axially of the fixing knob 6 and vertically in FIG. 1 by some amount. One surface of the fixing piece 5 is opposed to the side of the dovetail 4a and to the side of the swing portion rotary shaft 1a, while the other surface of the fixing piece 5 is opposed to a push rod 6a fixedly secured to the fixing knob 6. The tip end of the push rod 6 is formed into a semispherical shape so as to make point contact with the fixing piece 5. A lens 7 is mounted on the shift portion 4. The alternate long and two short dashes line extending from the back of the lens 7 represents bellows and the picture-taking light passes through the lens 7 and the bellows to a camera (not shown) rearward of the bellows. Why the fixing piece 5 is movable vertically in FIG. 1 by some amount will now be described in detail.

In FIG. 1, assume that, for example, the side of the dovetail 4a in the shift portion 4 which bears against the fixing piece 5 is somewhat offset to the right due to manufacturing inaccuracies. In this condition, if the fixing knob 6 is rotated to be moved rightwardly, the lower portion of the fixing piece 5 is brought into contact with the rotary shaft 1a. However, there is still a clearance between the fixing piece 5 and the dovetail 4a. When the fixing knob 6 is further rotated, the fixing piece 5 is tilted clockwise in the drawing, so that the upper portion of the fixing piece 5 contacts the dovetail 4a and the lower portion of the fixing piece 5 contacts the rotary shaft 1a. In this condition, the further rotation of the fixing knob 6 presses or urges the fixing piece 5 against dovetail 4a and the rotary shaft 1a of the mount body 1 so that the swing portion 3 is secured to the mount body 1 and the shift portion 4 is secured to the swing portion 3. Why the fixing piece 5 is made movable vertically by some amount is to enable the fixing piece 5 to tilt and to engage the side of the dovetail 4a and the side of the rotary shaft 1a at the same time. Of course, in FIG. 1, even if the side of the rotary shaft 1a which bears against the fixing piece 5 is offset to the right, the side of the dovetail 4a and the side of the rotary shaft 1a may still be engaged in the same manner as that described above.

Also, why the tip end of the push rod 6a is formed into a semispherical shape which makes point contact with the fixing piece 5 is to permit rotation of the fixing piece 5. That is, if the tip end of the push rod 6a made a substantial surface contact with the side of the fixing piece 5, the fixing piece 5 could not rotate. Therefore, if there is a manufacturing inaccuracy as already mentioned, the fixing piece 5 would contact only one of the dovetail 4a and the rotary shaft 1a and could fix only one of them.

Operation of the construction of the above-described first embodiment will now be explained. To effect a shift, the shift portion 4 is moved with respect to the rotary shaft 1a and the swing portion 3 in the direction of the dovetail groove 3a, namely in a direction perpendicular to the plane of the drawing of FIG. 1. To effect the swing, the shift portion 4 is rotated. The rotation of the shift portion 4 causes the swing portion 3 and the fixing knob 6 to be rotated about the rotary shaft 1a because the swing portion 3 and the shift portion 4 are one body with regard to rotation and because the fixing knob 6 is supported by the swing portion 3.

Thus, after the swing portion 3 and the shift portion 4 are suitably operated with respect to the mount body 1 to obtain a desired composition of a picture, the fixing knob 6 is tightened. Thereupon, the push rod 6a moves the fixing piece 5 to the right in FIG. 1. At this time, if the dovetail 4a is not offset with respect to the swing portion rotary shaft 1a, the fixing piece 5 is urged against the rotary shaft 1a and the side of the dovetail 4a at the same time and, by the friction between the contact portions thereof, the swing portion 3 is fixed to the mount body 1 and the shift portion 4 is fixed to the swing portion 3. If the dovetail 4a is offset with respect to the swing portion rotary shaft 1a, as already described, the fixing piece 5 is tilted and urged against the rotary shaft 1a and the side of the dovetail 4a. If the fixing knob 6 is loosened, the fixing of the swing portion 3 and the shift portion 4 are released together.

The main feature of the construction of this embodiment lies in its great simplicity.

Figure 4:
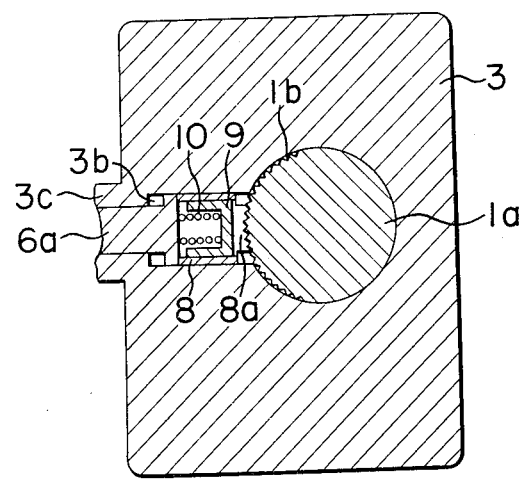
FIG. 4 is a cross-sectional view taken along line B—B in FIG. 3.
Figure 3:
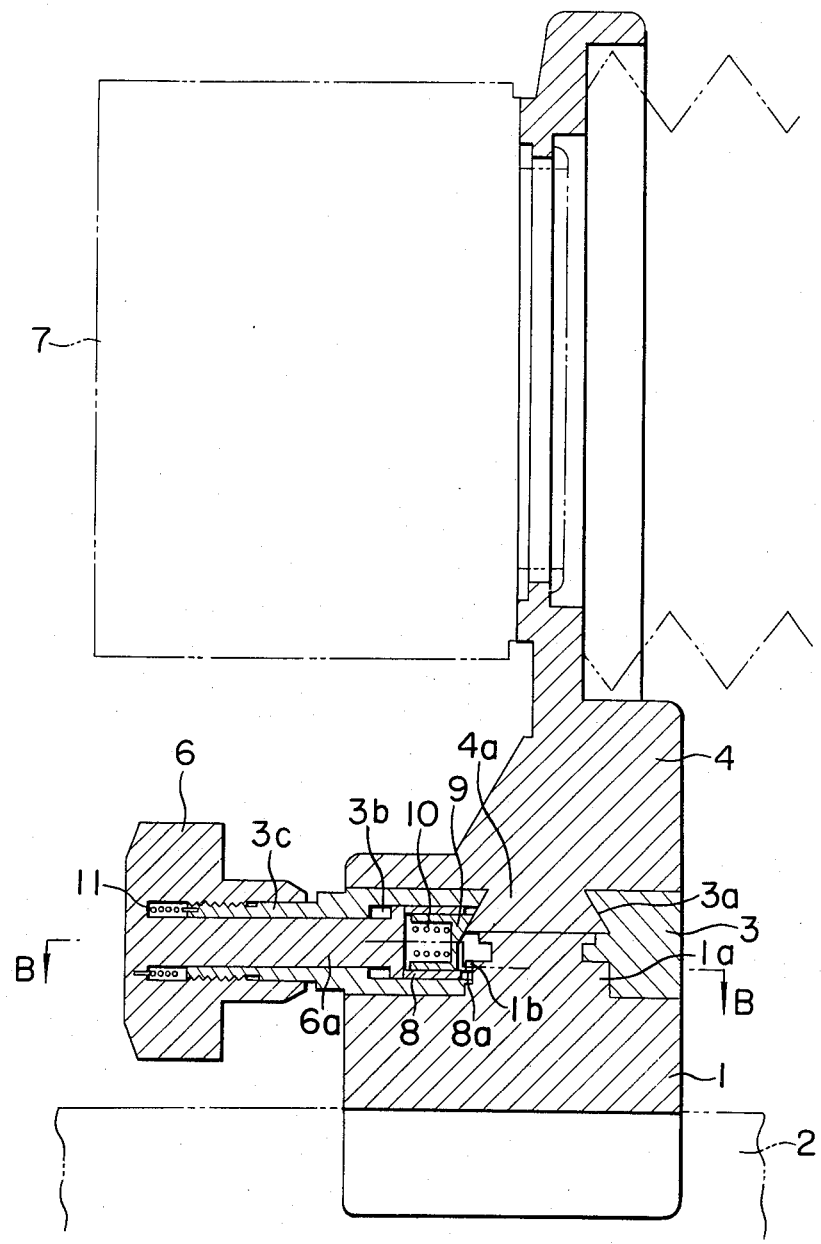
FIG. 3 is a cross-sectional front view of a second embodiment of the present invention.

FIG. 3 shows a second embodiment of the present invention and FIG. 4 is a cross-sectional view taken along line B—B in FIG. 1. In FIGS. 3 and 4, reference numerals similar to those in FIGS. 1 and 2 designate similar elements. In a portion of the circumference of the swing portion rotary shaft 1a provided in the upper portion of the mount body 1, there is provided a knurled portion 1b as shown in FIG. 4. In the cutout 3b of the swing portion 3, a swing fixing piece 8 provided with a knurled portion 8a meshing with the knurled portion 1b and a shift fixing piece 9 having a surface in contact with the dovetail 4a are disposed for some amount of axial movement with respect to the fixing knob 6. The swing fixing piece 8 is urged against the side of the rotary shaft 1a by directly contacting the push rod 6a and the shift fixing piece 9 is also urged against the side of the dovetail 4a by the push rod 6a through a compression spring 10 provided inside thereof. The fixing knob 6 is normally biased in loosening direction with respect to the shaft 3c for rotating the fixing knob 6, by a torsion spring 11. In the second embodiment now under discussion, the swing fixing piece 8 and the shift fixing piece 9 are movable axially for some amount, but they are not vertically movable as in the first embodiment. The reason is that, in the present embodiment, a member for fixing the shift portion 4 to the swing portion 3 and a member for fixing the swing portion to the body 1 are provided independently of each other so that the fixing operations thereof take place independently. This eliminates the need to vertically move the fixing pieces 8 and 9 by some amount in order to remove such error of the accuracy as described above.

Operation of the second embodiment will now be described.

When a desired composition has been obtained in the same manner as described in connection with the first embodiment, the fixing knob 6 is tightened, whereupon the push rod 6a pushes the swing fixing piece 8 to the right in FIG. 3 and pushes the shift fixing piece 9 also to the right through the agency of the compression spring 10. Thereupon, the knurled portion 1b of the swing portion rotary shaft 1a is engaged by the knurled portion 8a of the swing fixing piece 8 to fix the swing portion 3 to the mount body 1. On the other hand, the shift fixing piece 9 is urged against the side of the dovetail 4a and, by the friction of the contact portions thereof, the shift portion 4 is fixed to the swing portion 3. Next, when the fixing knob 6 is loosened, the fixing of the swing portion 3 and the shift portion 4 are released at the same time. As the fixing knob 6 is slightly loosened, the knob is moved slightly to the left in FIG. 3 by the action of a torsion spring 11, further tending to loosen the engagement between the fixing pieces 8, 9 and the shift portion and mount body. The amount of loosening is more than the amount of mesh between the knurled portions 1b and 8a. This is to prevent any damage which might be imparted to the knurled portions 1b and 8a when the swing portion 3 is forced to be rotated with respect to the mount body 1 in a condition wherein the amount of loosening of the fixing knob 6 is less than the amount of mesh between the knurled portions 1b and 8a, namely, in a condition wherein the mesh is not yet released. Also, even if the swing fixing piece 8 is not automatically returned to the left in the drawing by loosening the fixing knob 6, the swing fixing piece 8 is naturally forced out to the left by rotating the swing portion 3 in the loosened condition of the fixing knob 6, whereby the mesh between the knurled portions 8a and 1b is released.

A feature of the present embodiment lies in that the fixing of the swing portion can be reliably accomplished without slippage.

Generally, to fix the swing portion and the shift portion at the same time high degree of accuracy in manufacturing is required for each of associated elements. In the case of the requirement not being satisfied, only the swing portion is securely fixed while the shift portion is loosely fixed and vice versa. To avoid this, even if in the first embodiment the swing portion rotary shaft 1a and the dovetail 4a are offset in the right and left directions in FIG. 1 by some amount, the fixing knob 6 is tightened and the push rod 6a presses against the fixing piece 5. According to the offset the fixing piece 5 is tilted, so that the swing portion and the shift portion can be secured to each other at the same time.

In the second embodiment, the offset can be absorbed by the fixing of the shift portion 4 by the side of the dovetail 4a being pushed by the shift fixing piece 9 through the agency of the compression spring 10.

From the detailed foregoing, according to the present invention, the operation of one operating member 6 causes the swing portion 3 and the shift portion 4 to fix to the mount body 1 to thereby minimize the cumbersomeness of discriminating between different knobs to fix each of the swing portion and the shift portion.

Further, as in the first embodiment it is possible to eliminate the influence of manufacturing inaccuracies by a simple construction if the fixing piece 5 is tilted by operating a manually operating member 6 and this is urged against the mount body 1 and either the swing portion 3 or the shift portion 4 which is not provided with the fixing means 5, 6.

Also, if, as in the second embodiment, two fixing pieces 8, 9 are provided on either of the swing portion 3 and the shift portion 4 and at least one of these fixing pieces 8 and 9 is urged by a spring 10, it would be possible to couple the fixing pieces 8, 9 to the mount body 1 and the other member of the swing portion 3 and the shift portion 4 independently of each other. Consequently, the assembly is free from the influence of manufacturing inaccuracies. Further, if the coupling is effected by mesh between the knurled portions 8a, 1b, the members may be fixed reliably without slippage. Still further, if such a design is made that the fixing pieces 8, 9 are loosened more than the amount of mesh between the two knurled portions 8a, 1b if the operating member 6 is biased in the loosening direction and this is slightly loosened, no damage will occur even if the fixing of the operating member 6 is not sufficiently released.

I claim:

1. A swing and shifting mechanism in a camera comprising a mount body, a swing portion and a shift portion, a first one of said portions being disposed on the second portion and the second portion being disposed on the mount body, the second portion having a cut-out adjacent to the first portion and to the mount body, fixing means disposed within the cut-out, and a manual operating member on one of the portions, the manual operating member engaging the fixing means and operable to cause the fixing means to engage the mount body and the other portion for fixing the portion having the operating member to the mount body and to the other portion.

2. A swing and shifting mechanism according to claim 1, wherein the fixing means comprises a fixing piece between the operating member and both the mount body and the other portion, the fixing piece being movable by the operating member and tiltable to engage the mount body and said other portion at the same time.

3. A swing and shifting mechanism according to claim 2, wherein the first one of said portions is the shift portion, the second portion is the swing portion, and the mount body has a rotary shaft on which the swing portion is mounted, and wherein the shift portion includes a dovetail groove engaging a corresponding groove in the swing portion and engageable by said fixing piece.

4. A swing and shifting mechanism according to claim 3, wherein the cut-out has one dimension greater than the corresponding dimension of the fixing piece to allow the fixing piece to tilt, and wherein the fixing piece has a first surface engageable with the dovetail groove of the shift portion and a second surface engageable with the rotary shaft.

5. A swing and shifting mechanism according to claim 1, wherein the fixing means comprises a first fixing piece between the operating member and said other portion, a second fixing piece between the operating member and the mount body, the two fixing pieces being movable by the operating member and engageable with the other portion and the mount body, respectively, and a resilient member between at least one of the fixing pieces and the operating member biasing said fixing piece toward said engagement.

6. A swing and shifting mechanism according to claim 5, wherein at least one of said mount body and said other portion has a knurled area which is engageable with a corresponding knurled area on one of said fixing pieces.

7. A swing and shifting mechanism according to claim 6, comprising urging means urging the operating member in a direction to facilitate disengagement between said knurled areas.

8. A swing and shifting mechanism according to claim 5, wherein the first one of said portions is the shift portion, the second portion is the swing portion and the mount body has a rotary shaft on which the swing portion is mounted, and wherein the shift portion includes a dovetail groove engaging a corresponding groove in the swing portion, the first fixing piece being disposed within the cut-out with the second fixing piece being disposed within the first fixing piece for movement with respect thereto, the second fixing piece having a surface mating with the dovetail groove of the shift portion, and the resilient member being disposed between the operating member and the second fixing piece.

9. A swing and shifting mechanism according to claim 1, wherein the mount body has a rotary shaft defining a first axis about which the first and second portions rotate, and wherein the manual operating member is mounted on the second portion for rotation about a second axis substantially perpendicular to the first axis.

10. A swing and shifting mechanism according to claim 9, wherein the manual operating member includes knob means threaded onto the second portion and connected to a rod coaxial with the second axis, the rod engaging the fixing means and movable along the second axis in response to rotation of the knob means to move the fixing means into engagement with the mount body and the first portion.

11. A swing and shifting mechaniam according to claim 1, wherein the second portion has first and second surfaces engaging the first portion and the mount body, respectively, the cut-out communicating with the first and second surfaces to define corresponding first and second recesses in the surfaces, the first portion having a first projection received in the first recess, the first projection guiding the movement of the first portion, the mount body having a second projection received in the second recess, the second projection guiding the movement of the second portion, and wherein the fixing means engages the first and second projections to fix the second portion to both the first portion and to the mount body.

12. A swing and shifting mechanism in a camera comprising a mount body, a swing portion and a shift portion, a first one of said portions being disposed on the second portion and the second portion being disposed on the mount body, a manual operating member on the second portion, and fixing means between the operating member and both the mount body and the first portion, the fixing means being disposed within a cut-out in the second portion and being movable by the operating member for fixing the second portion to the mount body and to the first portion, the cut-out having one dimension greater than the corresponding dimension of the fixing means to allow the fixing means to tilt, and wherein the fixing means has a first surface engageable with the first portion and a second surface engageable with the mount body.

13. A swing and shifting mechanism in a camera comprising a mount body, a swing portion and a shift portion, a first one of said portions being disposed on the second portion and the second portion being disposed on the mount body, a manual operating member on the second portion, and fixing means disposed within a cut-out in the second portion, the fixing means including a first fixing piece between the operating member and the first portion and a secnd fixing piece between the operating member and the mount body, the two fixing pieces being movable by the operating member and engageable with the first portion and the mount body, respectively, and a resilient member between at least one of the fixing pieces and the operating member for biasing said fixing piece toward said engagement.

14. A swing and shifting mechanism in a camera comprising a mount body, a swing portion and a shift portion, the shift portion being rotatable about a first axis with respect to the mount body, a first one of said portions being disposed on the second portion and the second portion being disposed on the mount body, fixing means, and a manual operating member threaded onto the second portion for rotation about a second axis substantially perpendicular to the first axis, the manual operating member including a rod coaxial with the second axis and movable therealong, the rod engaging the fixing means for moving the fixing means into engagement with both the first portion and the mount body to fix the second portion to the first portion and to the mount body.

* * * * *